United States Patent
Song et al.

(10) Patent No.: US 11,652,221 B2
(45) Date of Patent: May 16, 2023

(54) SEPARATOR ASSEMBLY FOR AIR COOLED FUEL CELL AND FUEL CELL STACK INCLUDING THE SAME

(71) Applicants: Hyundai Motor Company, Seoul (KR); Kia Corporation, Seoul (KR)

(72) Inventors: Byung Gun Song, Gwangju-si (KR); Byeong-Heon Jeong, Seoul (KR); Young June Park, Gyeonggi-do (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 193 days.

(21) Appl. No.: 17/382,811

(22) Filed: Jul. 22, 2021

(65) Prior Publication Data
US 2022/0209255 A1   Jun. 30, 2022

(30) Foreign Application Priority Data
Dec. 24, 2020 (KR) .................. 10-2020-0183446

(51) Int. Cl.
| | |
|---|---|
| *H01M 8/0267* | (2016.01) |
| *H01M 8/2483* | (2016.01) |
| *H01M 8/0276* | (2016.01) |
| *H01M 8/026* | (2016.01) |
| *H01M 8/10* | (2016.01) |

(52) U.S. Cl.
CPC ......... *H01M 8/0267* (2013.01); *H01M 8/026* (2013.01); *H01M 8/0276* (2013.01); *H01M 8/0278* (2013.01); *H01M 8/2483* (2016.02); *H01M 2008/1095* (2013.01)

(58) Field of Classification Search
CPC .. H01M 8/0267; H01M 8/026; H01M 8/0276; H01M 8/0278; H01M 8/2483
See application file for complete search history.

(56) References Cited

U.S. PATENT DOCUMENTS

2021/0159518 A1*   5/2021   Okubo ................ H01M 8/2457

FOREIGN PATENT DOCUMENTS

| | | |
|---|---|---|
| JP | 2005141958 A | 6/2005 |
| JP | 2008027748 A | 2/2008 |
| JP | 2017510954 A | 4/2017 |
| JP | 2017182942 A | 10/2017 |
| KR | 10-0938023 B1 | 1/2010 |
| KR | 10-1459961 B1 | 11/2014 |

* cited by examiner

*Primary Examiner* — Eugenia Wang
(74) *Attorney, Agent, or Firm* — Morgan, Lewis & Bockius LLP (57) ABSTRACT

A separator assembly for an air-cooled fuel cell includes: a cathode separator and an anode separator, each of which having a cooling surface bonded to each other to face each other. The separator assembly further includes a plurality of first gaskets having a ring shape configured to surround and seal a plurality of inlet manifolds and a plurality of outlet manifolds are disposed on a cooling surface of any one separator among the cooling surface of the cathode separator and the cooling surface of the anode separator. The plurality of first gaskets are configured to allow cooling air for cooling the cooling surface to flow between first gaskets adjacent to each other.

11 Claims, 8 Drawing Sheets

-PRIOR ART-

SEPARATOR ASSEMBLY FOR AIR COOLED FUEL CELL AND FUEL CELL STACK INCLUDING THE SAME

CROSS REFERENCE TO RELATED APPLICATION

The present application claims priority to Korean Patent Application No. 10-2020-0183446, filed on Dec. 24, 2020 in the Korean Intellectual Property Office, the entire contents of which are incorporated herein for all purposes by reference.

TECHNICAL FIELD

The present disclosure relates to a separator assembly for an air-cooled fuel cell and a fuel cell stack including the same, and more particularly, to a separator assembly for an air-cooled fuel cell and a fuel cell stack including the same for omitting a manifold in which a coolant flows and forming a cooling air flow field in which cooling air flows while maintaining a surface pressure and a contact area using a gasket.

BACKGROUND

A fuel cell is a power generation device for converting chemical energy of fuel into electrical energy via an electrochemical reaction in a stack, is capable of being used not only to supply industrial, household, and vehicular driving power but also to supply power of a small electronic product such as a portable device, and recently has been widely used as a clean energy source of high efficiency.

Figure 1A:
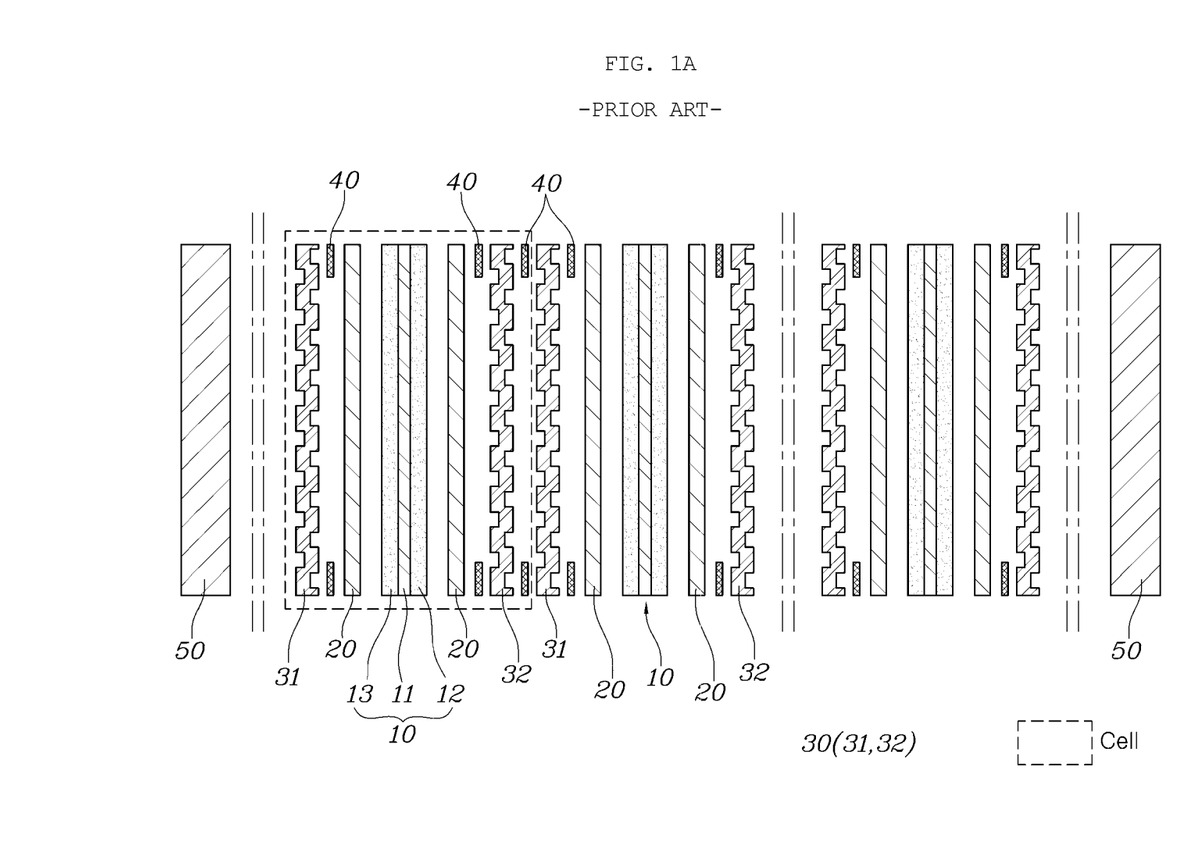
FIG. 1A is a diagram showing a configuration of a general fuel cell stack.

FIG. 1A is a diagram showing a configuration of a general fuel cell stack.

As seen from FIG. 1A, a membrane-electrode assembly (MEA) 10 is positioned at the innermost part of a general fuel cell stack, and includes a polymer electrolyte membrane 11 for allowing protons to move therein, and catalyst layers coated on opposite surfaces of the electrolyte membrane 11 to allow hydrogen and oxygen to react each other, that is, a fuel electrode (anode) 12, and an air electrode (cathode) 13.

A pair of gas diffusion layers (GDLs) 20 may be stacked on an outer part of the MEA 10, that is, on the outer part in which the fuel electrode 12 and the air electrode 13 are positioned, a pair of separators 30 in which a flow field is formed to supply fuel and to discharge water generated via reaction may be disposed across a gasket 40 in an outer part of the GDLs 20, and end plates 50 for supporting and fixing the aforementioned components may be coupled to the outermost part.

In this case, the pair of separators 30 may be classified into an anode separator 31 disposed on a fuel electrode (anode) and a cathode separator 32 disposed on an air electrode (cathode).

The fuel cell stack is formed by stacking a plurality of unit cells, and in this case the unit cells may be stacked to arrange the anode separator 31 disposed in any one of the unit cells so as to face the cathode separator 32 of a unit cell disposed adjacent thereto.

Accordingly, in order to smoothly perform a stack process of unit cells and to maintain alignment of the unit cells, the unit cells may be stacked so as to integrate the cathode separator 32 and the anode separator 31 which are respectively disposed in unit cells adjacent to each other and face each other.

Figure 1B:
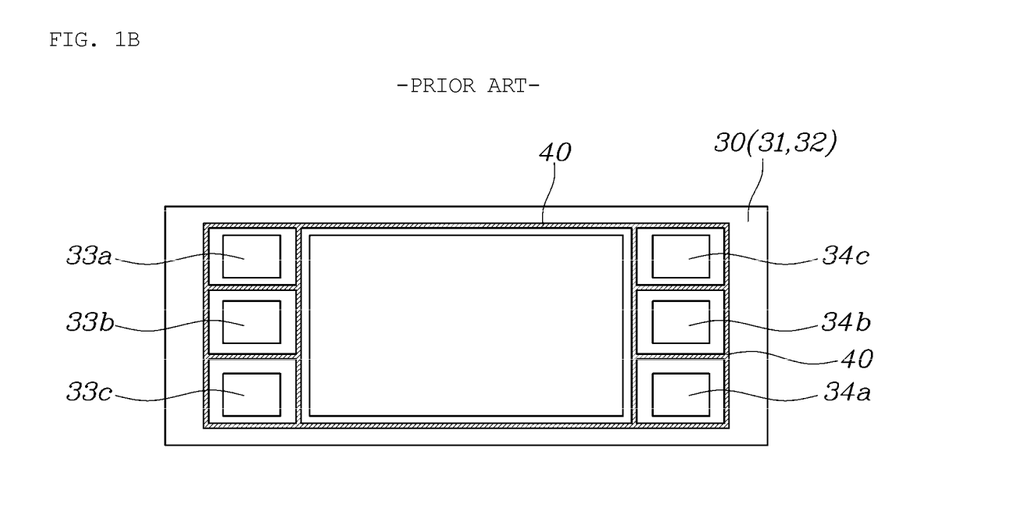
FIG. 1B is a diagram showing a conventional integrated separator.

FIG. 1B is a diagram showing a conventional separator.

As seen from FIG. 1B, a conventional separator 30 includes a reaction surface on which an MEA is disposed and which is formed in a central region, and a plurality of inlet manifolds 33a, 33b, and 33c and a plurality of outlet manifolds 34a, 34b, and 34c, which are formed at opposite regions of the reaction surface. In this case, for sealing the reaction surface, the inlet manifolds 33a, 33b, and 33c, and the outlet manifolds 34a, 34b, and 34c, a region in which the reaction surface, the inlet manifolds 33a, 33b, and 33c, and the outlet manifolds 34a, 34b, and 34c are formed may be surrounded using the gasket 40.

A cooling flow field is formed between the cathode separator 32 and the anode separator 31 which are respectively disposed in unit cells adjacent to each other and allows a coolant to flow in the cooling flow field.

Accordingly, the inlet manifold 33b and the outlet manifold 34b through which a coolant flows as well as the inlet manifolds 33a and 33c and the outlet manifolds 34a and 34c through which air and hydrogen for reaction gas flow are necessarily formed in the cathode separator 32 and the anode separator 31.

As such, the coolant flowing between the cathode separator 32 and the anode separator 31 performs a function of cooling the fuel cell, but when the gasket is deformed and damaged, there is a problem in that the coolant leaks while a sealing state is released.

Accordingly, research has been conducted into an air-cooled fuel cell.

The contents described as the related art have been provided only to assist in understanding the background of the present disclosure and should not be considered as corresponding to the related art known to those having ordinary skill in the art.

SUMMARY

An object of the present disclosure is to provide a separator assembly for an air-cooled fuel cell and a fuel cell stack including the same for omitting a manifold in which a coolant flows and forming a cooling air flow field in which cooling air flows while maintaining a surface pressure and a contact area using a gasket.

According to an embodiment of the present disclosure, a separator assembly for an air-cooled fuel cell includes a cathode separator including a reaction surface as one surface and a cooling surface as another surface and including a plurality of inlet manifolds disposed at one side of the cathode separator and into which reaction gas is introduced and a plurality of outlet manifolds which are formed at another side of the cathode separator and through which reaction gas is discharged, and an anode separator including a reaction surface as one surface and a cooling surface formed as another surface and including a plurality of inlet manifolds disposed at one side and into which reaction gas is introduced and a plurality of outlet manifolds disposed at another side and from which reaction gas is discharged, wherein a cooling surface of the cathode separator and a cooling surface of the anode separator are bonded to each other to face each other, and a plurality of first gaskets having a ring shape for surrounding and sealing the plurality of inlet manifolds and the plurality of outlet manifolds are disposed on a cooling surface of any one separator among the cooling surface of the cathode separator and the cooling surface of the anode separator and allow cooling air for cooling the cooling surface to flow between first gaskets adjacent to each other.

A second gasket formed like a line may be formed on a cooling surface of a separator on which the first gasket is formed among the cooling surface of the cathode separator and the cooling surface of the anode separator and may surround the cooling surface to seal a region between the plurality of inlet manifolds and the plurality of outlet manifolds.

The second gasket may be formed in one pair and be connected to each of the first gaskets surrounding the opposite outermost inlet manifolds among the plurality of inlet manifolds and the opposite outermost outlet manifolds among the plurality of outlet manifolds.

A third gasket formed in a line may be formed on the reaction surface of the cathode separator and the reaction surface of the anode separator at a position corresponding to a position of the first gasket formed between the plurality of inlet manifolds and between the outlet manifolds.

Some of the plurality of inlet manifolds formed on the cathode separator may be a cathode air inlet manifold for allowing air for reaction gas to flow to the reaction surface of the cathode separator and remaining some of the plurality of inlet manifolds may be a cathode hydrogen inlet manifold in which hydrogen for reaction gas flows, and a fourth gasket for surrounding the cathode hydrogen inlet manifolds and a third gasket formed therebetween and the cathode hydrogen outlet manifolds and a third gasket formed therebetween and sealing circumferences of the cathode hydrogen inlet manifolds and the cathode hydrogen outlet manifolds may be formed on the reaction surface of the cathode separator.

Some of the plurality of inlet manifolds formed on the anode separator may be an anode hydrogen inlet manifold for allowing hydrogen for reaction gas to flow to the reaction surface of the anode separator and remaining some of the plurality of inlet manifolds is an anode air inlet manifold in which air for reaction gas flows, and a fifth gasket for surrounding the anode air inlet manifolds and a third gasket formed therebetween and sealing circumferences of the anode air inlet manifolds may be formed on the reaction surface of the anode separator.

A sixth gasket formed like a ring may be formed on the reaction surface of the cathode separator and the reaction surface of the anode separator and may surround the reaction surface to seal regions in which the plurality of inlet manifolds and the outlet manifolds are formed and a region therebetween.

An inlet manifold into which a coolant is introduced and an outlet manifold from which the coolant is discharged may not be formed on the cathode separator and the anode separator.

A plurality of reaction gas flow fields having a structure engraved in a direction towards the plurality of outlet manifolds from the plurality of inlet manifolds may be formed on the reaction surface of the cathode separator and the reaction surface of the anode separator parallel thereto to allow reaction gas to be introduced into the plurality of inlet manifolds formed at one side and to flow in a direction towards the plurality of outlet manifolds formed at a remaining side, a plurality of cooling air flow fields in which cooling air flows between a plurality of reaction gas flow fields may be formed by the reaction gas flow fields having an engraving structure on the cooling surface of the cathode separator and the cooling surface of the anode separator, and the reaction gas flow fields and the cooling air flow fields may be formed parallel to each other.

According to another embodiment of the present disclosure, there is provided a fuel cell stack formed by stacking a plurality of fuel cells comprising a membrane-electrode assembly (MEA), a pair of gas diffusion layers, a cathode separator, and an anode separator, wherein the cathode separator includes a reaction surface formed as one surface and a cooling surface formed as a remaining surface and includes a plurality of inlet manifolds which are formed at one side and into which reaction gas is introduced and a plurality of outlet manifolds which are formed at a remaining side and through which reaction gas is discharged, the anode separator includes a reaction surface formed as one surface and a cooling surface formed as a remaining surface and includes a plurality of inlet manifolds which are formed at one side and into which reaction gas is introduced and a plurality of outlet manifolds which are formed at a remaining side and from which reaction gas is discharged, a cooling surface of the cathode separator and a cooling surface of the anode separator are assembled to each other to face each other, and a plurality of first gaskets formed like a ring for surrounding and sealing the plurality of inlet manifolds and the plurality of outlet manifolds are formed on a cooling surface of any one separator among the cooling surface of the cathode separator and the cooling surface of the anode separator and allow cooling air for cooling the cooling surface to flow between first gaskets adjacent to each other.

A second gasket formed like a line may be formed on a cooling surface of a separator on which the first gasket is formed among the cooling surface of the cathode separator and the cooling surface of the anode separator and may surround the cooling surface to seal a region between the plurality of inlet manifolds and the plurality of outlet manifolds, and the second gasket may be formed in one pair and is connected to each of the first gaskets surrounding the opposite outermost inlet manifolds among the plurality of inlet manifolds and the opposite outermost outlet manifolds among the plurality of outlet manifolds.

A plurality of reaction gas flow fields having a structure engraved in a direction towards the plurality of outlet manifolds from the plurality of inlet manifolds may be formed on the reaction surface of the cathode separator and the reaction surface of the anode separator parallel thereto to allow reaction gas to be introduced into the plurality of inlet manifolds formed at one side and to flow in a direction towards the plurality of outlet manifolds formed at a remaining side, a plurality of cooling air flow fields in which cooling air flows between a plurality of reaction gas flow fields may be formed by the reaction gas flow fields having an engraving structure on the cooling surface of the cathode separator and the cooling surface of the anode separator, and the reaction gas flow fields and the cooling air flow fields may be formed parallel to each other.

DETAILED DESCRIPTION OF THE EMBODIMENTS

Reference will now be made in detail to embodiments, examples of which are illustrated in the accompanying drawings. However, the present disclosure may, be embodied in many different forms and should not be construed as being limited to the embodiments set forth herein, rather these embodiments are provided so that this disclosure will be thorough and complete, and will fully convey the concept of the present disclosure to those skilled in the art. The same reference numerals in the drawings denote like elements.

A fuel cell stack according to an embodiment of the present disclosure may be configured using improved air-cooled structures of separators that face each other while maintaining the structure of a conventional fuel cell stack shown in FIGS. 1A and 1B. Accordingly, a manifold for a coolant formed in a separator may be omitted.

Thus, as shown in FIGS. 1A and 1B, the fuel cell stack according to an embodiment of the present disclosure may be configured by connecting several unit cells in series to each other, the unit cell including a membrane-electrode assembly (MEA) 10, a pair of gas diffusion layers 20, an anode separator 31 (hereinafter denoted by reference numeral "200"), and a cathode separator 32 (hereinafter denoted by reference numeral "300"). Thus, the anode separator 200 included in one cell may be disposed to face the cathode separator 300 included in a cell adjacent thereto, and according to the present embodiment, a cooling surface C of the anode separator 200 and a cooling surface C of the cathode separator 300, which face each other, may be bonded to each other to configure a separator assembly.

The separator assembly will be described more.

Figure 2A:
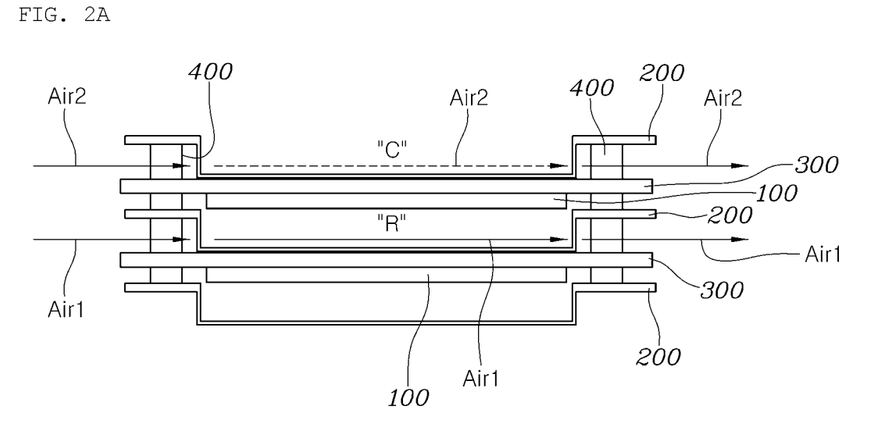
FIG. 2A is a conceptual diagram showing a fuel cell stack according to an embodiment of the present disclosure.
Figure 2B:
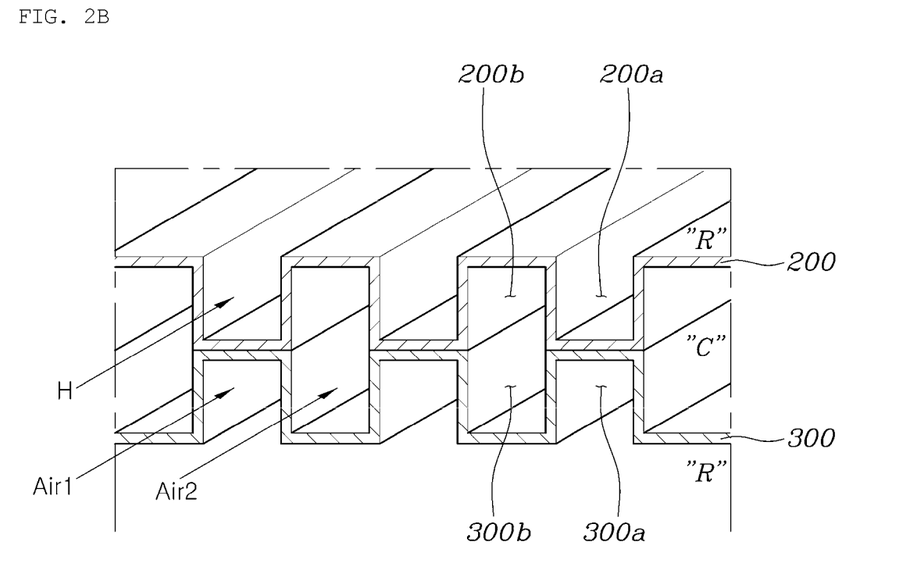
FIG. 2B is a conceptual diagram showing a main part of a fuel cell stack according to an embodiment of the present disclosure.
Figure 3A:
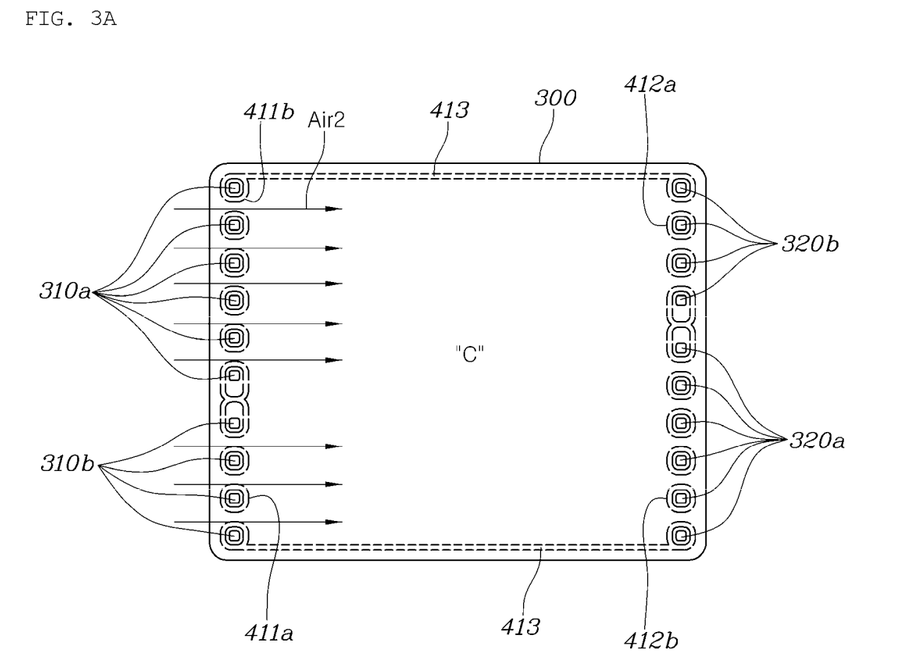
FIGS. 3A to 3D are diagrams separately showing a separator assembly for an air-cooled fuel cell according to an embodiment of the present disclosure.

FIG. 2A is a conceptual diagram showing a fuel cell stack according to an embodiment of the present disclosure. FIG. 2B is a conceptual diagram showing a main part of a fuel cell stack according to an embodiment of the present disclosure. FIGS. 3A to 3D are diagrams separately showing a separator assembly for an air-cooled fuel cell according to an embodiment of the present disclosure. FIG. 4 is a diagram showing the case in which a separator assembly for an air-cooled fuel cell is assembled according to an embodiment of the present disclosure.

As shown in the drawings, the separator assembly for an air-cooled fuel cell according to an embodiment of the present disclosure may include the cathode separator 300 including a reaction surface R formed as one surface and a cooling surface C formed as the other surface and including a plurality of inlet manifolds 310a and 310b which are formed at one side and into which reaction gas is introduced and a plurality of outlet manifolds 320a and 320b which are formed at the other side and through which reaction gas is discharged, and the anode separator 200 including the reaction surface R formed as one surface and the cooling surface C formed as the other surface and including the plurality of inlet manifolds 210a and 210b which are formed at one side and into which reaction gas is introduced and a plurality of outlet manifolds 220a and 220b which are formed at the other side and through which reaction gas is discharged.

Accordingly, the cooling surface C of the cathode separator 300 and the cooling surface C of the anode separator 200 may be bonded to face each other. In particular, FIG. 2B is a conceptual diagram showing a main part of a fuel cell stack according to an embodiment of the present disclosure. FIG. 2B is a diagram showing a longitudinal-direction sectional view of a separator assembly. Here, the longitudinal direction may refer to a direction towards the outlet manifolds 220a, 220b, 320a, and 320b formed at the other side from the inlet manifolds 210a, 210b, 310a, and 310b formed at one side of the cathode separator 300 and the anode separator 200.

As shown in FIG. 2B, a plurality of reaction gas flow fields 200a and 300a having a structure engraved in a direction towards the plurality of outlet manifolds 220a, 220b, 320a, and 320b from the plurality of inlet manifolds 210a, 210b, 310a, and 310b may be formed on the reaction surface R of the cathode separator 300 and the reaction surface R of the anode separator 200 parallel thereto so as to allow reaction gas to be introduced into the plurality of inlet manifolds 210a, 210b, 310a, and 310b formed at one side and to flow in a direction towards the plurality of outlet manifolds 220a, 220b, 320a, and 320b formed at the other side. In this case, the engraving structure formed as the reaction gas flow fields 200a and 300a may refer to a structure in which a structure configured by channels and lands applied to a conventional separator is repeatedly formed.

Accordingly, a plurality of cooling air flow fields 200b and 300b in which cooling air Air2 flows between the plurality of reaction gas flow fields 200a and 300a may be formed by the reaction gas flow fields 200a and 300a having the engraving structure on the cooling surface C of the cathode separator 300 and the anode separator 200.

Accordingly, the reaction gas flow fields 200a and 300a and cooling air flow fields 200b and 300b may be formed parallel to each other on opposite surfaces of the cathode separator 300 and the anode separator 200. Accordingly, a direction in which hydrogen H and air Air1 for reaction gas flowing through the reaction gas flow fields 200a and 300a and a direction in which the cooling air Air2 flows may have the same directivity. Thus, a pitch between the reaction gas flow fields 200a and 300a and a pitch between the cooling air flow fields 200b and 300b may be reduced, thereby increasing the output density of the fuel cell stack.

Regions around the cooling surface C of at least one separator among the cooling surface C of the cathode separator 300 and the cooling surface C of the anode separator 200, the reaction surface R of the cathode separator 300, and the reaction surface of the anode separator 200 may be sealed using a gasket 400 while ensuring a flow field in which the reaction gases H and Air1 and the cooling air Air2 flow.

First, the gasket 400 formed on the cooling surface C of at least one separator among the cooling surface C of the cathode separator 300 and the cooling surface C of the anode separator 200 will be described. In this case, the cooling air Air2 may flow between the cooling surface C of the cathode separator 300 and the cooling surface C of the anode separator 200 that face each other.

According to the present embodiment, the case in which the gasket 400 is formed on the cooling surface C of the cathode separator 300 will be exemplified. The present disclosure is not limited to the case in which the gasket 400 is formed only on a cooling surface of the cathode separator 300, and selectively the gasket 400 may be formed only on the cooling surface C of the anode separator 200 or the gasket 400 may be entirely formed on the cooling surface C of the cathode separator 300 and the cooling surface C of the anode separator 200.

The cathode separator 300 may include the reaction surface R formed as one surface and the cooling surface C formed as the other surface and may include the plurality of inlet manifolds 310a and 310b which are formed at one side and into which the reaction gases H and Air1 are introduced and the plurality of outlet manifolds 320a and 320b which are formed at the other side and through which the reaction gases H and Air1 are discharged.

In detail, FIG. 3A is a diagram showing a cooling surface of a cathode separator. As shown in FIG. 3A, a plurality of cathode hydrogen inlet manifolds 310a for allowing the hydrogen H for reaction gas to flow to the reaction surface R of the anode separator 200 and a plurality of cathode air inlet manifolds 310b for introducing the air Air1 for reaction gas into the reaction surface R of the cathode separator 300 may be formed at one side of the cathode separator 300. In addition, a plurality of cathode hydrogen outlet manifolds 320a for allowing hydrogen H for reaction gas discharged from the reaction surface R of the anode separator 200 to flow and a plurality of cathode air outlet manifolds 320b for discharging the air Air1 for reaction gas from the reaction surface R of the cathode separator 300 may be formed at the other side of the cathode separator 300.

In this case, the air Air1 and the hydrogen H for reaction gas may not be allowed to flow to the cooling surface C of the cathode separator 300. Thus, as shown in FIG. 3A, a plurality of first gaskets 411a, 411b, 412a, and 412b for respectively surrounding and sealing the plurality of cathode hydrogen inlet manifolds 310a, the cathode air inlet manifolds 310b, the cathode hydrogen outlet manifolds 320a, and the cathode air outlet manifolds 320b may be formed on the cooling surface C of the cathode separator 300.

The first gaskets 411a, 411b, 412a, and 412b may be formed like a closed ring in order to completely surround the plurality of cathode hydrogen inlet manifolds 310a, the cathode air inlet manifolds 310b, the cathode hydrogen outlet manifolds 320a, and the cathode air outlet manifolds 320b, which are formed on the cathode separator 300 and are exposed out of the cooling surface C.

In order to prevent the cooling air Air2 flowing between the cooling surface C of the cathode separator 300 and the cooling surface C of the anode separator 200 from leaking outside at an intermediate region of a cooling surface while flowing from one side of the cathode separator 300 to the other side thereof, a second gasket 413 for surrounding the cooling surface may be formed on the cooling surface C of the cathode separator 300 to seal a region between the plurality of inlet manifolds 310a and 310b and the outlet manifolds 320a and 320b.

The second gasket 413 may be formed in a line in order to surround an edge of width-direction opposite sides of the cooling surface. In this case, the second gasket 413 may be formed in one pair, and may be connected to each of the first gaskets 411a, 411b, 412a, and 412b that surround the opposite outermost inlet manifolds 310a and 310b among the plurality of inlet manifolds 310a and 310b and the opposite outermost outlet manifolds 320a and 320b among the plurality of outlet manifolds 320a and 320b.

Figure 3B:
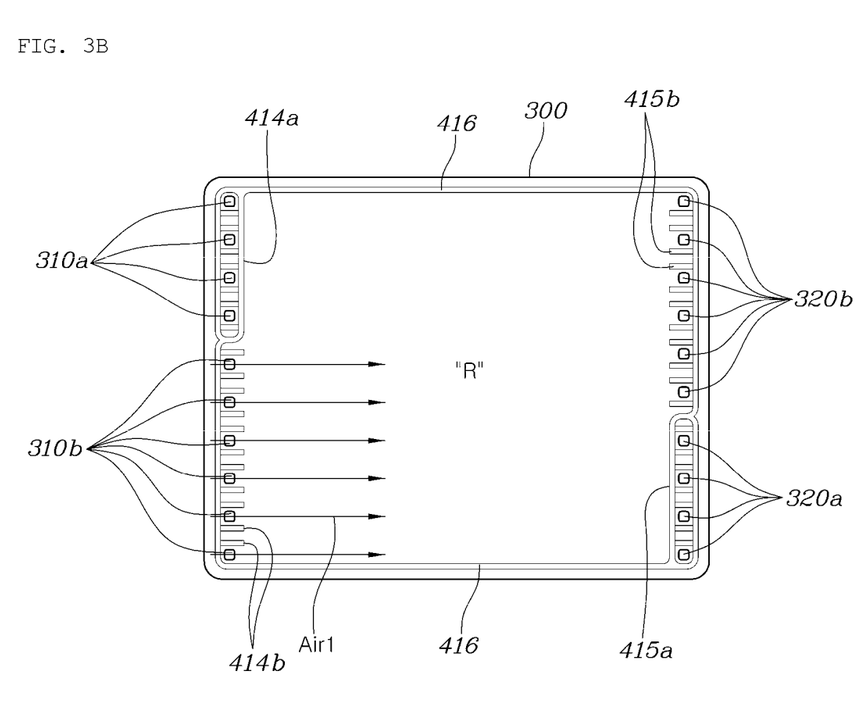
Figure 4:
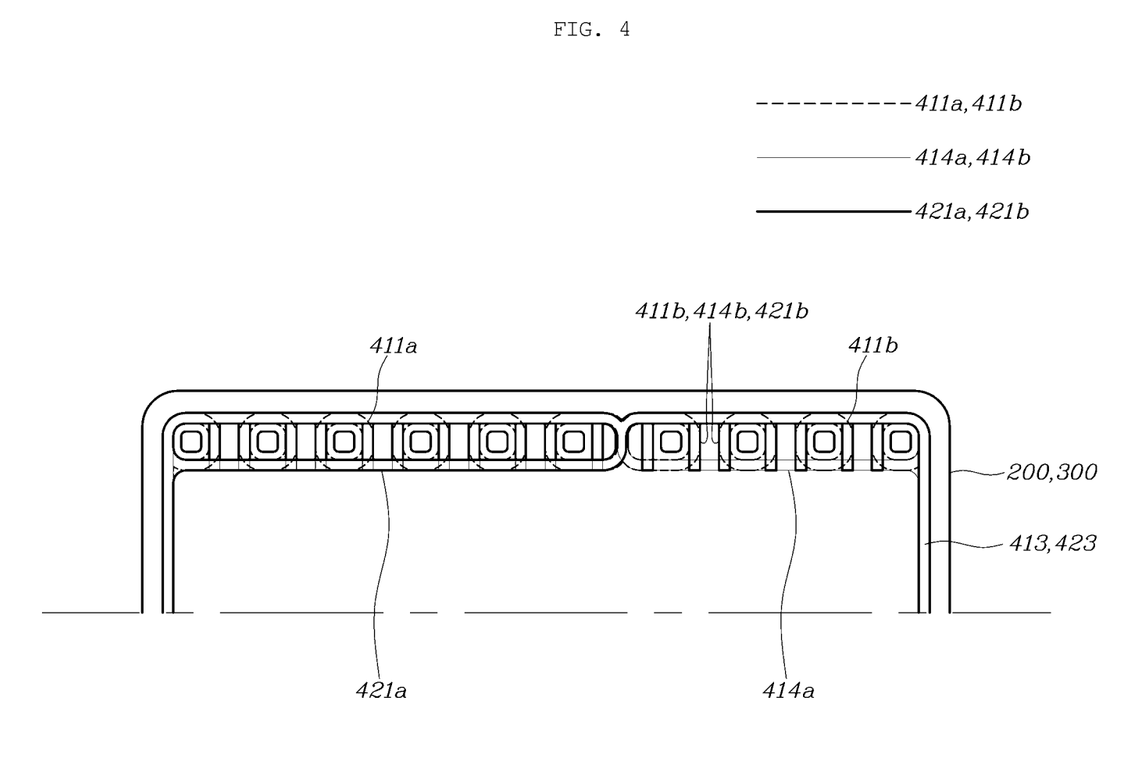
FIG. 4 is a diagram showing the state in which a separator assembly for an air-cooled fuel cell is assembled according to an embodiment of the present disclosure.

FIG. 3B is a diagram showing a reaction surface of a cathode separator. As shown in FIG. 3B, third gaskets 414b and 415b formed in a line may be formed on the reaction surface R of the cathode separator 300 at the positions corresponding to the positions of the first gaskets 411a, 411b, 412a, and 412b formed between the plurality of cathode hydrogen inlet manifolds 310a, the cathode air inlet manifolds 310b, the cathode hydrogen outlet manifolds 320a, and the cathode air outlet manifolds 320b (refer to FIG. 4).

As such, the positions at which the first gaskets 411a, 411b, 412a, and 412b are formed and the positions at which the third gaskets 414b and 415b are formed may correspond to each other, and accordingly the cathode separator 300 and the anode separator 200 may be bonded to each other to form a separator assembly, and when a plurality of fuel cells are stacked, a surface pressure may be maintained constant.

Only the air Air1 for reaction gas may be introduced into and discharged from the reaction surface R of the cathode separator 300, and the hydrogen H for reaction gas may not be allowed to flow. Thus, as shown in FIG. 3B, fourth gaskets 414a and 415a that surround the cathode hydrogen inlet manifolds 310a, the third gaskets 414b and 415b formed therebetween, the cathode hydrogen outlet manifolds 320a, and the third gaskets 414b and 415b formed therebetween and seal circumferences of the cathode hydrogen inlet manifolds 310a and the cathode hydrogen outlet manifolds 320a may be formed on the reaction surface R of the cathode separator 300.

The fourth gaskets 414a and 415a may be formed on the cathode separator 300 and may completely surround the plurality of cathode hydrogen inlet manifolds 310a and the cathode hydrogen outlet manifolds 320a that are exposed out of the reaction surface R while being connected to other gaskets.

A sixth gasket 416 surrounding the reaction surface R may be formed on the reaction surface R of the cathode separator 300 to seal regions on which the plurality of cathode hydrogen inlet manifolds 310a, the cathode air inlet manifolds 310b, the cathode hydrogen outlet manifolds 320a, and the cathode air outlet manifolds 320b are formed and regions therebetween.

The sixth gasket 416 may be formed like a closed ring in order to completely surround a circumference of the reaction surface R of the cathode separator 300. In this case, the sixth gasket 416 formed on the reaction surface R of the cathode separator 300 may be formed to contain a position corresponding to the position at which the second gasket 413 formed on the cooling surface C of the cathode separator 300 is disposed (refer to FIG. 4).

Accordingly, the plurality of cathode hydrogen inlet manifolds 310a and the cathode hydrogen outlet manifolds 320a that are exposed out of the reaction surface R of the cathode separator 300 may be sealed like a ring, a circumference of which has a closed structure by the fourth gaskets 414a and 415a and the sixth gasket 416.

The plurality of cathode air inlet manifolds 310b and the cathode air outlet manifolds 320b that are exposed out of the reaction surface R of the cathode separator 300 may be opened to allow the air Air1 for reaction gas to flow in a space therebetween.

Figure 3C:
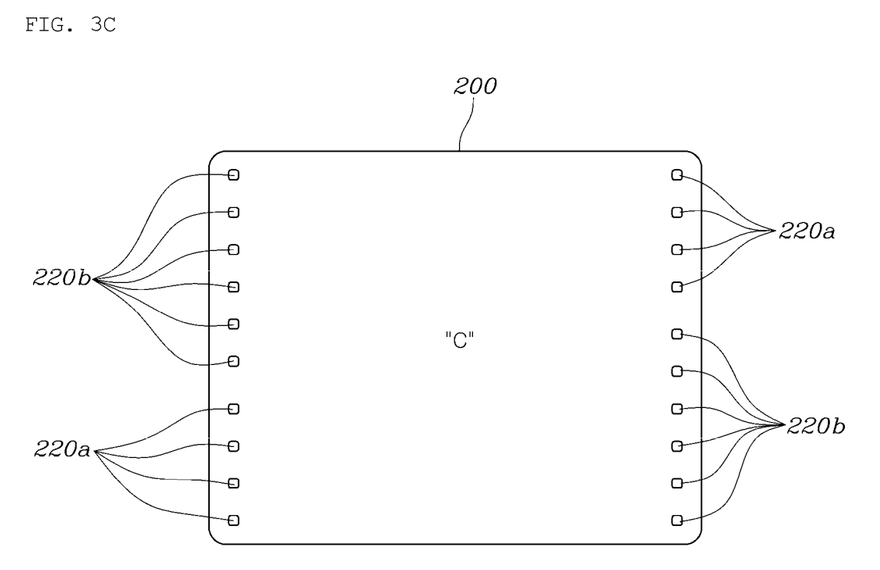

Like the cathode separator 300, the anode separator 200 may also include the reaction surface R formed as one surface and the cooling surface C formed as the other surface and include the plurality of inlet manifolds 210a and 210b which are formed at one side and into which reaction gas is introduced and the plurality of outlet manifolds 220a and 220b which are formed at the other side and through which reaction gas is discharged.

In detail, FIG. 3C is a diagram showing a cooling surface of an anode separator. As shown in FIG. 3C, the plurality of anode hydrogen inlet manifolds 210a for allowing the hydrogen H for reaction gas to be introduced to the reaction surface R of the anode separator 200 and the plurality of anode air inlet manifolds 210b for allowing the air Air1 for reaction gas to flow to the reaction surface R of the cathode separator 300 may be formed at one side of the anode separator 200. In addition, the plurality of anode hydrogen outlet manifolds 220a for discharging the hydrogen H for reaction gas discharged from the reaction surface of the anode separator 200 and the plurality of anode air outlet manifolds 220b for allowing the air Air1 for reaction discharged from the reaction surface R of the cathode separator 300 to flow may be formed at the other side of the anode separator 200.

In this case, the air Air1 and the hydrogen H for reaction gas may not be allowed to flow to the cooling surface C of the anode separator 200. Thus, the plurality of first gaskets 411a, 411b, 412a, and 412b and the second gasket 413 may be formed on the cooling surface C of the anode separator 200. However, because the first gaskets 411a, 411b, 412a, and 412b and the second gasket 413 need to be formed on any one of the cooling surface C of the cathode separator 300 and the cooling surface C of the anode separator 200, which face each other, according to the present embodiment, the plurality of first gaskets 411a, 411b, 412a, and 412b and the second gasket 413 may be formed on the cooling surface C of the cathode separator 300, and accordingly the first gaskets 411a, 411b, 412a, and 412b and the second gasket 413 may not be formed on the cooling surface C of the anode separator 200.

Figure 3D:
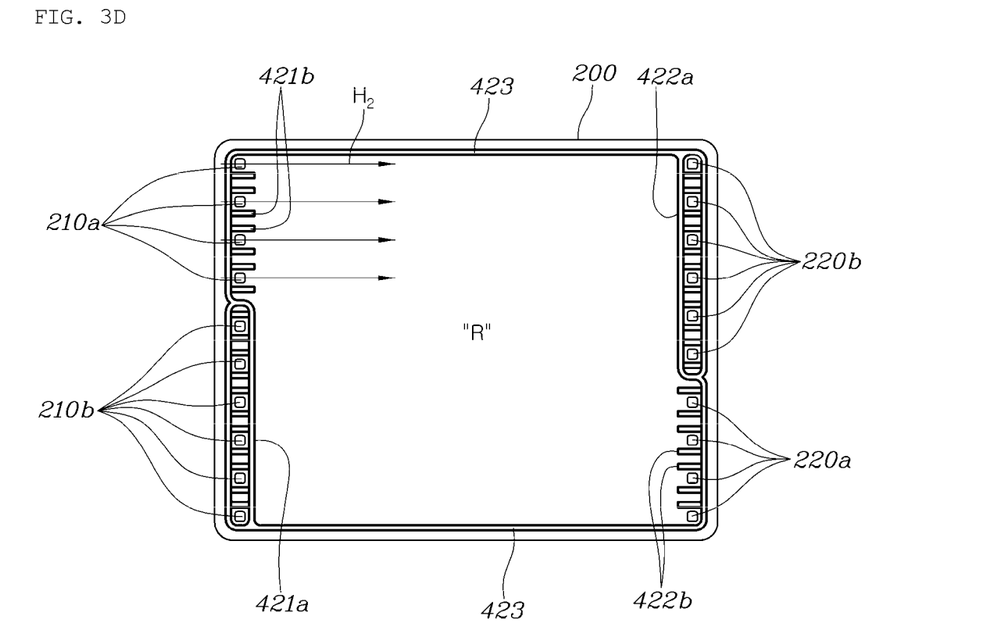

FIG. 3D is a diagram showing a reaction surface of an anode separator. As shown in FIG. 3D, third gaskets 421b and 422b formed in a line may be formed on the reaction surface R of the anode separator 200 at the positions corresponding to the positions of the first gaskets 411a, 411b, 412a, and 412b formed between the plurality of anode hydrogen inlet manifolds 210a, the anode air inlet manifolds 210b, the anode hydrogen outlet manifolds 220a, and the anode air outlet manifolds 220b (refer to FIG. 4).

As such, like in the anode separator 200, the positions at which the first gaskets 411a, 411b, 412a, and 412b are formed and the positions at which the third gaskets 421b and 422b are formed may correspond to each other, and accordingly the cathode separator 300 and the anode separator 200 may be bonded to each other to form a separator assembly, and when a plurality of fuel cells are stacked, a surface pressure may be maintained constant.

Only the hydrogen H for reaction gas may be introduced into and discharged from the reaction surface of the anode separator 200, and the air Air1 for reaction gas may not be allowed to flow. Thus, as shown in FIG. 3D, fifth gaskets 421a and 422a that surround the anode air inlet manifolds 210b, the third gaskets 421b and 422b formed therebetween, the anode air outlet manifolds 220b, and the third gaskets 421b and 422b formed therebetween and seal circumferences of the anode air inlet manifolds 210b and the anode air outlet manifolds 220b may be formed on the reaction surface R of the anode separator 200.

The fifth gaskets 421a and 422a may be formed on the anode separator 200 and may completely surround the plurality of anode air inlet manifolds 210b and the anode air outlet manifolds 220b that are exposed out of the reaction surface R while being connected to other gaskets.

A sixth gasket 423 surrounding the reaction surface may be formed on the reaction surface of the anode separator 200 to seal regions on which the plurality of anode hydrogen inlet manifolds 210a, the anode air inlet manifolds 210b, the anode hydrogen outlet manifolds 220a, and the anode air outlet manifolds 220b are formed and regions therebetween.

The sixth gasket 423 may be formed like a closed ring in order to completely surround a circumference of the reaction surface R of the anode separator 200. In this case, the sixth gasket 423 formed on the reaction surface R of the anode separator 200 may be formed to contain a position corresponding to the position at which the second gasket 413 formed on the cooling surface C of the cathode separator 300 is disposed (refer to FIG. 4).

Accordingly, the plurality of anode air inlet manifolds 210b and the anode air outlet manifolds 220b that are exposed out of the reaction surface R of the anode separator 200 may be sealed like a ring, a circumference of which has a closed structure by the fifth gaskets 421a and 422a and the sixth gasket 423.

The plurality of anode hydrogen inlet manifolds 210a and the anode hydrogen outlet manifolds 220a that are exposed out of the reaction surface R of the anode separator 200 may be opened to allow the hydrogen H for reaction gas to flow in a space therebetween.

According to an embodiment of the present disclosure, a coolant manifold into and from which a coolant is introduced and discharged may be omitted while a surface pressure of a reaction surface is maintained at a conventional level by employing a separator having a similar structure to a conventional fuel cell structure, and accordingly the area of a reaction surface may be increased and the width of a reaction gas diffusion flow field may be reduced by ensuring a space for a reaction surface manifold, thereby improving the output density of the fuel cell.

A cooling flow field through which cooling air flows may be formed on a cooling surface of a separator using an engraving structure of a flow field formed on the reaction surface of the separator, and thus a cell pitch may be reduced, thereby improving the output density of the fuel cell.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A separator assembly for an air-cooled fuel cell, comprising:
   a cathode separator including a reaction surface as one surface and a cooling surface as another surface, wherein the cathode separator comprises:
   a plurality of cathode inlet manifolds disposed at one side of the cathode separator such that reaction gas is introduced into the plurality of cathode inlet manifolds; and
   a plurality of cathode outlet manifolds disposed at another side of the cathode separator such that reaction gas is discharged through the plurality of cathode outlet manifolds; and
   an anode separator including a reaction surface as one surface and a cooling surface as another surface, wherein the anode separator comprises:
   a plurality of anode inlet manifolds disposed at one side of the anode separator such that reaction gas is introduced into the plurality of anode inlet manifolds; and
   a plurality of anode outlet manifolds disposed at another side of the anode separator such that reaction gas is discharged from the plurality of anode outlet manifolds, wherein the cooling surface of the cathode separator and the cooling surface of the anode separator are in a tight contact with each other to face each other, wherein a plurality of first gaskets having a ring shape for surrounding and sealing the plurality of anode and cathode inlet manifolds and the plurality of anode and cathode outlet manifolds are disposed on the cooling surface of any one of the cathode separator and the anode separator, and wherein the plurality of first gaskets are configured to allow cooling air for cooling the cooling surface to flow between first gaskets that are adjacent to each other among the plurality of first gaskets.

2. The separator assembly of claim 1, further comprising a second gasket having a line shape, wherein the second gasket is disposed on a cooling surface of a separator, on which the plurality of first gaskets are disposed, among the cooling surface of the cathode separator and the cooling surface of the anode separator, and wherein the second gasket is configured to surround the cooling surface to seal a region between the plurality of anode and cathode inlet manifolds and the plurality of anode and cathode outlet manifolds.

3. The separator assembly of claim 2, wherein the second gasket includes a pair of second gaskets, each of which connected to each of the plurality of first gaskets, respectively, surrounding opposite outermost anode and cathode inlet manifolds among the plurality of respective anode and cathode inlet manifolds and the opposite outermost anode and cathode outlet manifolds among the plurality of respectively anode and cathode outlet manifolds.

4. The separator assembly of claim 1, further comprising third gaskets having a line shape, wherein the third gaskets are disposed on the reaction surface of the cathode separator and the reaction surface of the anode separator, respectively, at a position corresponding to a position of a first gasket, among the plurality of first gaskets, disposed between the plurality of anode and cathode inlet manifolds of respective cathode separator and anode separator and between the plurality of anode and cathode outlet manifolds of respective cathode separator and anode separator.

5. The separator assembly of claim 4, wherein some of the plurality of cathode inlet manifolds of the cathode separator are cathode air inlet manifolds for allowing air for reaction gas to flow to the reaction surface of the cathode separator and remaining some of the plurality of cathode inlet manifolds are cathode hydrogen inlet manifolds in which hydrogen for reaction gas flows, wherein a plurality of fourth gaskets are disposed on the reaction surface of the cathode separator, and wherein the plurality of fourth gaskets are configured to:
surround the cathode hydrogen inlet manifolds and a third gasket, among the third gaskets, disposed between the cathode hydrogen inlet manifolds, and respectively surround the cathode hydrogen outlet manifolds and a third gasket, among the third gaskets, disposed between the cathode hydrogen outlet manifolds, and seal circumferences of the cathode hydrogen inlet manifolds and the cathode hydrogen outlet manifolds, respectively.

6. The separator assembly of claim 4, wherein some of the plurality of anode inlet manifolds disposed on the anode separator are anode hydrogen inlet manifolds for allowing hydrogen for reaction gas to flow to the reaction surface of the anode separator and remaining some of the plurality of anode inlet manifolds are anode air inlet manifolds in which air for reaction gas flows, and wherein a fifth gasket is disposed on the reaction surface of the anode separator and configured to:
surround the anode air inlet manifolds and a third gasket, among the plurality of third gaskets, formed therebetween, and seal circumferences of the anode air inlet manifolds.

7. The separator assembly of claim 4, further comprising sixth gaskets having a ring shape and disposed on the reaction surface of the cathode separator and the reaction surface of the anode separator, respectively, wherein the plurality of sixth gaskets are configured to surround the corresponding reaction surface to seal regions in which the plurality of anode and cathode inlet manifolds and the plurality of anode and cathode outlet manifolds.

8. The separator assembly of claim 1, wherein a plurality of reaction gas flow fields having a structure engraved in a direction towards the plurality of reaction gas flow fields outlet manifolds from the plurality of reaction gas flow fields inlet manifolds are respectively disposed on the reaction surface of the cathode separator and the reaction surface of the anode separator parallel to the reaction surface of the cathode separator to allow reaction gas to be introduced into the plurality of anode and cathode inlet manifolds at the one side of each of the cathode separator and the anode separator and to flow in a direction towards the plurality of outlet manifolds at the another side of each of the cathode separator and the anode separator, wherein the cooling surface of the cathode separator and the cooling surface of the anode separator respectively include a plurality of cooling air flow fields in which cooling air flows between the plurality of reaction gas flow fields, and wherein the reaction gas flow fields and the cooling air flow fields are parallel to each other.

9. A fuel cell stack having a plurality of fuel cells, the fuel cell stack comprising a membrane-electrode assembly (MEA), a pair of gas diffusion layers, a cathode separator, and an anode separator, wherein the cathode separator includes a reaction surface as one surface and a cooling surface as another surface, the cathode separator including:
a plurality of cathode inlet manifolds at one side of the cathode separator and into which reaction gas is introduced; and
a plurality of cathode outlet manifolds at another side of the cathode separator and through which reaction gas is discharged, wherein the anode separator includes a reaction surface as one surface and a cooling surface as another surface, the anode separator including:
a plurality of anode inlet manifolds at one side of the anode separator and into which reaction gas is introduced; and
a plurality of anode outlet manifolds at another side of the anode separator and from which reaction gas is discharged, wherein the cooling surface of the cathode separator and the cooling surface of the anode separator are in a tight contact with each other to face each other, and wherein a plurality of first gaskets having a ring shape for surrounding and sealing the plurality of cathode and anode inlet manifolds and the plurality of cathode and anode outlet manifolds are disposed on a cooling surface of any one separator among the cooling surface of the cathode separator and the cooling surface of the anode separator, the plurality of first gaskets are configured to allow cooling air for cooling the cooling surface to flow between first gaskets, among the plurality of first gaskets, adjacent to each other.

10. The fuel cell stack of claim 9, wherein a second gasket having a line shape is disposed on a cooling surface of a separator having the first gasket among the cooling surface of the cathode separator and the cooling surface of the anode separator, the second gasket configured to surround the cooling surface to seal a region between the plurality of cathode and anode inlet manifolds and the plurality of cathode and anode outlet manifolds of the corresponding separator, and wherein the second gasket includes a pair of second gaskets, each of which connected to each of the plurality of first gaskets, respectively, surrounding opposite outermost cathode and anode inlet manifolds among the plurality of cathode and anode inlet manifolds, respectively, and opposite outermost cathode and anode outlet manifolds among the plurality of cathode and anode outlet manifolds, respectively.

11. The fuel cell stack of claim 9, wherein further comprising a plurality of reaction gas flow fields having a structure engraved in a direction towards the plurality of anode and cathode outlet manifolds from the plurality of anode and cathode inlet manifolds and disposed on the reaction surface of the cathode separator and the reaction surface of the anode separator parallel to allow reaction gas to be introduced into the plurality of anode and cathode inlet manifolds and to flow in a direction towards the plurality of cathode and anode outlet manifolds; and a plurality of cooling air flow fields through which cooling air flows between the plurality of reaction gas flow fields having an engraving structure on the cooling surface of the cathode separator and the cooling surface of the anode separator, wherein the reaction gas flow fields and the cooling air flow fields are parallel to each other.

* * * * *